A. L. MATTE.
PIPE COUPLING.
APPLICATION FILED FEB. 19, 1916.
1,277,982.
Patented Sept. 3, 1918.
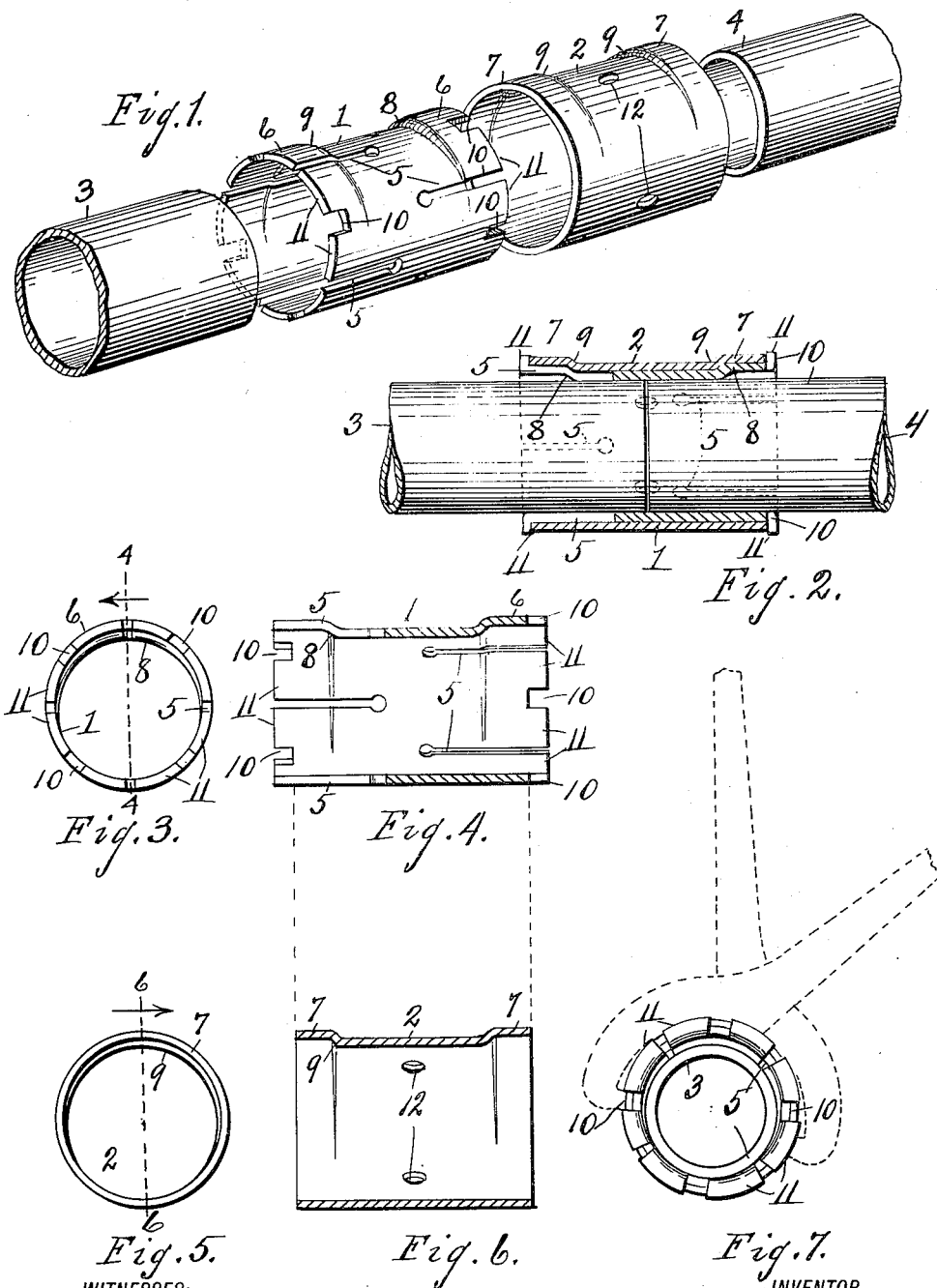
WITNESSES:
O. B. Baenziger
M. Broesamle
INVENTOR
Andrew L. Matte.
BY
B. S. Wheeler
ATTORNEY

UNITED STATES PATENT OFFICE.

ANDREW L. MATTE, OF DETROIT, MICHIGAN.

PIPE-COUPLING.

1,277,982.  Specification of Letters Patent.  Patented Sept. 3, 1918.

Application filed February 19, 1916. Serial No. 79,262.

*To all whom it may concern:*

Be it known that I, ANDREW L. MATTE, a citizen of the United States, residing at Detroit, in the county of Wayne and State of Michigan, have invented a new and useful Pipe-Coupling, of which the following is a specification.

This invention relates to pipe couplings and consists in the novel construction and association of parts as hereinafter set forth and claimed.

The object of the invention is the provision of simple and effective means for detachably connecting cylindrical members, such as pipes, shafts and the tubular sections of electric cable conduits, in such manner as to avoid the use of screw threaded connections or fittings and to insure the firm union and ready attachment and detachment of the parts.

In attaining the above object the invention contemplates the employment of a pair of telescopic sleeves which are formed with enlarged coinciding eccentric portions at opposite ends. The inner sleeve, which receives the ends of the members to be coupled, is provided with a series of longitudinal slots to render the end portions resilient, and is adapted to be contracted upon and to firmly embrace said members through the eccentric action of the outer sleeve when rotated thereon.

In carrying out the above invention I have shown in the accompanying drawings a preferred form of embodiment of the essential features, in which, Figure 1 is a perspective view of the parts of the coupling disengaged, together with portions of the tubular members to be coupled withdrawn therefrom.

Fig. 2 is a central vertical longitudinal section through the coupling attached to and embracing the ends of the tubular members, shown in elevation, in the assembled position of the parts.

Fig. 3 is an end elevation of the inner coupling member.

Fig. 4 is a central vertical section on line 4—4 of Fig. 3.

Fig. 5 is a front end elevation of the outer coupling member.

Fig. 6 is a central vertical section on line 6—6 of Fig. 5.

Fig. 7 is an end elevation of the coupling embracing the tubular members to be coupled, and indicating by dotted lines the application of wrenches for contracting the coupling thereon.

The parts of the device herein referred to are designated by corresponding characters of reference marked on the several views of the accompanying drawings.

The coupling, which is designed to effect an adjustable and detachable connection between two cylindrical members without requiring the screw-threading of the connections or engaging parts as is usual, consists of two concentrically nested sleeves 1 and 2, respectively, the former and inner one of which is adapted to receive one end of each of the members 3 and 4 to be coupled and to embrace and bind said members in axial alinement when contracted thereon. The ends of this sleeve are provided with one or more longitudinal kerfs or slots 5 which extend well into the body of the sleeve to render the wall thereof resilient and compressible diametrically at both ends of said sleeve.

Both of the sleeves 1 and 2 are formed with enlarged annular end portions 6 and 7, respectively, which are offset to lie eccentric to the axes of the body portions of said sleeves, and form peripheral shoulders 8 and 9, respectively, upon corresponding sides thereof. The outer sleeve 2, which rotatably embraces the inner sleeve 1, is mounted thereon by telescoping or forcing it over one of the compressible ends of said inner sleeve, and is normally positioned thereon with its eccentric end portions 7 coinciding with the eccentric end portions 6 of the inner sleeve, and with the body portions concentrically engaged between the shoulders 8 and 9, respectively, of said sleeves as shown in Fig. 2.

The inner sleeve which is formed slightly longer than the outer sleeve has formed in the eccentric end portions thereof a series of notches 10 which are spaced intermediate the slots 5 and serve with said slots to divide the ends of the sleeve into a plurality of bendable lips or tongues 11, which, when folded outwardly, as shown in Figs. 2 and 7, form notched peripheral flanges engaging the ends of the outer sleeve to retain it against axial movement and which positions the notches 10 radially of the flanges to serve as wrench holds for the reception of a spanner wrench to anchor said inner sleeve against rotation with the outer sleeve. To facilitate the rotating of the outer sleeve, one or more peripheral apertures 12 may be formed in the body of the sleeve for the reception of a spanner wrench for operation in connection with the wrench for the inner sleeve, as indicated by dotted lines in Fig. 7.

It will now be understood that with the parts of the coupling assembled and in position upon the ends of the members to be coupled, as shown in Fig. 2, through the application of rotary force upon the outer sleeve to turn it about the inner sleeve, the concentric portions of the eccentric ends of said outer sleeve will be gradually carried into engagement with the eccentric end portions of the inner sleeve, causing a contraction of the flexible end portions of the latter upon the members embraced thereby in a manner to firmly bind and retain said members against withdrawal therefrom.

It is obvious that minor changes in the structural details may be made to meet varying requirements without departing from the essential features of the invention, which is herewith presented as including all such modifications and changes as properly come within the scope and meaning of the following claims.

I claim:

1. A pipe coupling, comprising an inner contractible cylindrical member having an eccentric peripheral portion, and an outer rotatable sleeve embracing concentrically said inner member and having an enlarged annular eccentric portion embracing concentrically the eccentric portion of said inner member to eccentrically engage and contract said member through the rotation of said sleeve.

2. A pipe coupling comprising an inner tubular longitudinally slotted cylindrical sleeve having an eccentric peripheral projection, and an outer rotatable sleeve concentrically embracing the inner sleeve and having an enlarged annular portion eccentrically embracing rotatively the peripheral projection of said inner sleeve.

3. A pipe coupling, comprising an inner contractible cylindrical member having eccentric peripheral end portions, and an outer rotatable sleeve embracing said inner member concentrically and having eccentric end portions coinciding with the end portions of said inner member and adapted to eccentrically engage and contract said end portions through the rotation of said sleeve.

4. A pipe coupling comprising an inner cylindrical contractible sleeve having eccentric annular end portions, an outer rotatable sleeve embracing said inner sleeve concentrically and having eccentric annular end portions coinciding with and eccentrically embracing rotatively the end portions of said inner sleeve to diametrically contract the ends thereof, and means for rotating said sleeves relatively.

5. In a pipe coupling, in combination with two cylindrical members to be connected, a longitudinally slotted cylindrical coupling sleeve having enlarged annular eccentric end portions and adapted to receive the ends of said members to be coupled, an outer rotatable sleeve concentrically embracing the coupling sleeve and having enlarged annular eccentric end portions concentrically embracing and eccentrically engaging rotatively the end portions of said coupling sleeve, and means to retain said sleeves against relative axial movement.

6. In a pipe coupling, in combination with two cylindrical members to be coupled, an inner longitudinally slotted cylindrical sleeve having enlarged annular eccentric end portions and adapted to embrace the ends of said members to be coupled, an outer rotatable sleeve concentrically embracing said inner sleeve between the enlarged end portions thereof and having enlarged annular eccentric end portions coinciding with and eccentrically embracing rotatively the end portions of said inner sleeve to contract said sleeve upon said members, radial flanges on said inner sleeve to limit axial movement of said outer sleeve thereon and to afford anchorage for said inner sleeve against rotation, and means to facilitate rotation of said outer sleeve.

In testimony whereof I sign this specification.

ANDREW L. MATTE.